United States Patent
Brennan et al.

(10) Patent No.: US 11,132,477 B1
(45) Date of Patent: *Sep. 28, 2021

(54) INTERACTIVE SIMULATION AND SOLVER FOR MECHANICAL, FLUID, AND ELECTRO-MECHANICAL SYSTEMS

(71) Applicant: MSC.Software Corporation, Newport Beach, CA (US)

(72) Inventors: Douglas Brennan, Newport Beach, CA (US); Douglas James Neill, Irvine, CA (US); Herbert Dennis Hunt, Green Cove Springs, FL (US)

(73) Assignee: MSC.Software Corporation, Newport Beach, CA (US)

( * ) Notice: Subject to any disclaimer, the term of this patent is extended or adjusted under 35 U.S.C. 154(b) by 789 days.

This patent is subject to a terminal disclaimer.

(21) Appl. No.: 14/863,346

(22) Filed: Sep. 23, 2015

Related U.S. Application Data (63) Continuation of application No. 13/353,225, filed on Jan. 18, 2012, now Pat. No. 9,152,740.

(51) Int. Cl.
*G06F 30/20* (2020.01)

(52) U.S. Cl.
CPC .................... *G06F 30/20* (2020.01)

(58) Field of Classification Search
CPC ............ G06F 17/5018; G06F 19/3437; G06F 2217/16; G06F 17/5009; G06F 17/5095; G06F 17/50; G06F 2217/80; G06F 19/26; G06F 17/5086; G06T 17/20; G06T 17/00; G06T 19/00; E21B 43/243; E21B 43/247; E21B 43/30; E21B 47/02208
See application file for complete search history.

(56) References Cited

U.S. PATENT DOCUMENTS

| | | | | |
|---|---|---|---|---|
| 4,791,583 A | * | 12/1988 | Colburn | G06T 17/20 345/420 |
| 4,989,166 A | * | 1/1991 | Akasaka | B29C 33/3835 700/197 |
| 5,408,638 A | * | 4/1995 | Sagawa | G06F 17/5018 703/2 |
| 5,838,947 A | * | 11/1998 | Sarin | G06F 17/5022 703/14 |
| 5,937,155 A | | 8/1999 | Kennedy et al. | |
| 7,382,367 B1 | * | 6/2008 | Lu | G06T 17/20 345/419 |

(Continued)

FOREIGN PATENT DOCUMENTS

WO  WO-2007147166 A2 * 12/2007  ............... G06N 5/02

OTHER PUBLICATIONS

WO_2007147166 (Year: 2007).*

(Continued)

*Primary Examiner* — Rehana Perveen
*Assistant Examiner* — Cuong V Luu
(74) *Attorney, Agent, or Firm* — Foley & Lardner LLP (57) ABSTRACT

The model builder may generate a model object, and initiate the solver to determine whether the model object has constraints that effect the model object. The solver can generate solution data these constraints. The solver may pass any solution data it obtains to the solution display generator, so that the user can view the solution data while the user is building the model with the model builder.

15 Claims, 4 Drawing Sheets

(56) References Cited

U.S. PATENT DOCUMENTS

| | | | | |
|---|---|---|---|---|
| 8,001,527 | B1* | 8/2011 | Qureshi | G06F 11/079 717/120 |
| 8,095,345 | B2* | 1/2012 | Hoversten | G01V 11/00 703/2 |
| 2002/0067373 | A1* | 6/2002 | Roe | G01V 11/00 715/762 |
| 2003/0016832 | A1* | 1/2003 | Naganarayana | G06F 17/5018 381/71.4 |
| 2003/0222871 | A1* | 12/2003 | Brombolich | G06F 17/5018 345/427 |
| 2003/0225553 | A1* | 12/2003 | Brombolich | G06T 17/20 703/2 |
| 2004/0034514 | A1* | 2/2004 | Langemyr | G06F 17/12 703/2 |
| 2005/0188323 | A1* | 8/2005 | Shibata | G06F 17/248 715/760 |
| 2005/0259594 | A1* | 11/2005 | Smith | H04L 43/50 370/254 |
| 2006/0066609 | A1* | 3/2006 | Iodice | G06T 19/20 345/419 |
| 2006/0089823 | A1* | 4/2006 | Meyer | G06F 17/5018 703/2 |
| 2008/0052048 | A1* | 2/2008 | Onodera | G06F 17/5018 703/2 |
| 2008/0056506 | A1* | 3/2008 | Naganarayana | G06F 17/5018 381/71.4 |
| 2008/0123927 | A1* | 5/2008 | Miga | G06T 7/344 382/131 |
| 2008/0155427 | A1 | 6/2008 | Leblay et al. | |
| 2008/0195651 | A1 | 8/2008 | Rachmiel et al. | |
| 2008/0275910 | A1* | 11/2008 | Molina-Moreno | G06F 8/35 |
| 2009/0112489 | A1* | 4/2009 | Ghaboussi | E02D 1/022 702/42 |
| 2010/0332526 | A1* | 12/2010 | Nori | G06F 16/213 707/769 |
| 2011/0112808 | A1* | 5/2011 | Anderson | G16H 50/50 703/2 |
| 2011/0172965 | A1 | 7/2011 | McIntyre et al. | |
| 2011/0224954 | A1* | 9/2011 | Jayasundara | G06F 17/5009 703/1 |
| 2011/0251830 | A1* | 10/2011 | Hilliard | G06F 17/5018 703/1 |
| 2012/0316858 | A1* | 12/2012 | Kundert | G01R 31/318357 703/14 |
| 2013/0063434 | A1* | 3/2013 | Miga | A61B 90/36 345/420 |
| 2013/0077113 | A1* | 3/2013 | Rolleston | G06F 3/1208 358/1.13 |
| 2013/0103369 | A1* | 4/2013 | Huynh | G06F 17/5018 703/2 |
| 2013/0144572 | A1* | 6/2013 | Huang | G06F 17/5018 703/2 |
| 2014/0222406 | A1 | 8/2014 | Taylor | |

OTHER PUBLICATIONS

U.S. Notice of Allowance dated Jul. 17, 2015, from related U.S. Appl. No. 13/353,225.

U.S. Notice of Allowance dated Aug. 14, 2015, from related U.S. Appl. No. 13/353,225.

U.S. Office Action dated Jan. 7, 2015, from related U.S. Appl. No. 13/353,225.

U.S. Office Action dated Feb. 27, 2014, from related U.S. Appl. No. 13/353,225.

U.S. Office Action dated Aug. 27, 2014, from related U.S. Appl. No. 13/353,225.

* cited by examiner

INTERACTIVE SIMULATION AND SOLVER FOR MECHANICAL, FLUID, AND ELECTRO-MECHANICAL SYSTEMS

CROSS-REFERENCE TO RELATED PATENT APPLICATIONS

This application is a continuation of U.S. application Ser. No. 13/353,225, filed on Jan. 18, 2012, which is incorporated herein by reference in its entirety.

BACKGROUND

Techniques for rendering models often involves five basic steps: 1) creation of a finite element model, typically, but not always from geometry/design information imported from CAD systems; 2) enhancement of the finite element model with material, property, load and constraint attributes; 3) transformation of the attributed model into a formatted file suitable for consumption by a finite element solver; 4) transformation of the information contained within the formatted solver files into a set of equations and subsequent solution of these equations by the finite element solver; and 5) post-processing of the results from the solution of the equations. In practice, steps 1 thru 3 rarely yield a valid simulation at the first attempt and users frequently discover modeling deficiencies or errors after completion of steps 4 and 5 that have to be corrected by partially repeating steps 1 thru 3. This cycle of build, solve, review, fix is generally executed numerous times before a valid model and solution is obtained.

SUMMARY OF THE DISCLOSURE

Systems, software, and processes for implementing a technique to allow a user to see the impact on the solution of the model arising from changes made to the model as it is being generated rather than requiring the user to wait until the entire model is finished are provided. Such a platform may utilize a variety of modules, the details of which are set forth in the detailed description.

In one configuration a computer readable media may store instructions that instruct a microprocessor to create and execute a work environment for allowing a user to develop computer-aided simulations. The computer readable media may store several modules such as:

a model builder for generating a simulation model and creating model objects, solver for creating solver objects, checking model validity and executing solver methods, including but not limited to solving equations, fragment collector for obtaining fragments (fragments contain one or more model objects.) of the model from the model builder and data validator for determining whether a model fragment contains sufficient data to enable fragment solution. In most embodiments, a determination as to whether the model builder and solver can use a common data representation is made at design time. If a common data representation cannot be generated, the data validator may instruct a solver object generator to form a solver object using the model fragments, and instruct a data coupler to continuously and automatically synchronize data stored in the model object and the solver object. The solver may solve a subset of the model created from the fragments of the simulation model, and provide solution data to the solution display generator while the user is using the model builder to develop the model. In some configurations, if the data validator determines that the solver will not be able to execute the solver methods on the model/solver objects provided by the fragment collector because the fragment does not contain certain required information, a data prognosticator will provide proxy data to the solver in the form of a proxy object so that the solver can access the proxy object (which contains the missing data) to enable execution of the solver methods. The solver may execute the solver methods on at least one of the model objects, solver objects, and proxy objects while the user is building the model to generate solution data from the objects. The platform may provide the solution data that the solver generated from the objects to a solution display generator during the modeling process. The solution display generator may create and display this solution data to the user, so that the user may use this information to update and correct the model while it is being built; rather than displaying solution data only after the user has built an entire model.

In another configuration of the invention a method for building a model is provided. The method may include automatically solving fragments of a simulation model while a user is building the model to generate solution data during the building process; displaying the solution data to the user; updating the model data using the solution data; using fragments from the updated model to generate updated solution data during the building process; and displaying the updated solution data to the user.

DETAILED DESCRIPTION

The arrangements described herein may be implemented as software stored on computer readable media for causing a computer to implement the software. The computer may have a non-transitory storage devices like a hard drive, system memory, a microprocessor, and network connectivity hardware. In a similar manner, the arrangements described herein may be implemented via a series of steps or processes executed by a computer via the microprocessors executing instructions stored in system memory. The arrangements described herein may also be embodied as a specially-designed computer which contains the software in memory and implements the instructions required by the software.

Figure 1:
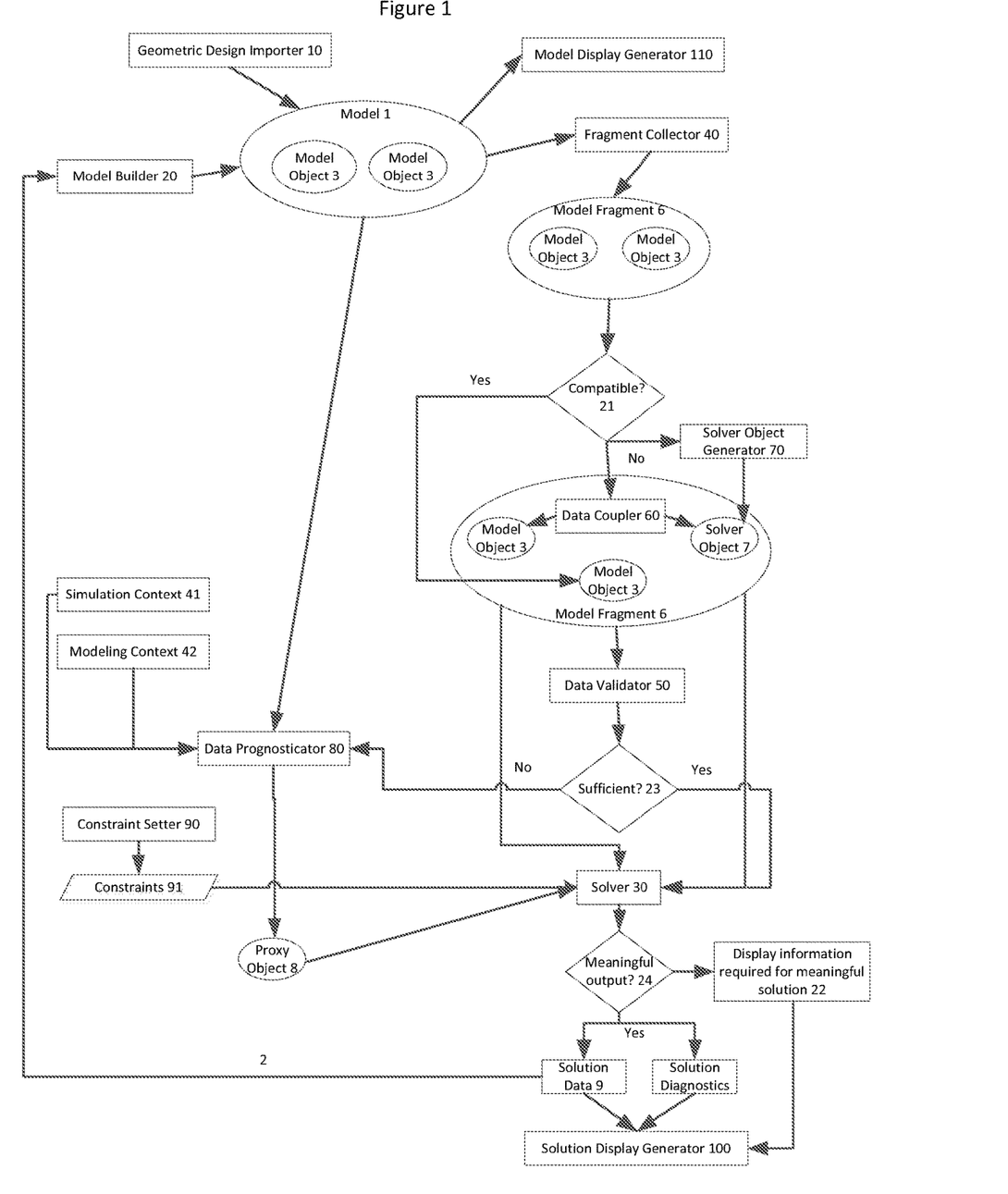
FIG. 1 shows a flow diagram according to a configuration of the interactive solver.

In one aspect an article of computer readable media is provided. That article (such as an optical disk or hard drive) contains software for causing a microprocessor in a computer to implement a CAE (computer aided engineering) simulation platform/environment (FIG. 1 generally shows the platform). The platform may contain many different modules such as a model builder 20, a finite element solver 30, and a solution display generator 100. Structurally speaking, these modules take the form of components of the CAE software, and may be compiled and executed by the microprocessor (if a language such as C++® is used), interpreted and invoked at run time (for languages such as Java®), or run directly from a script (in languages such as Python or Visual Basic). If an object-oriented language is used these modules may take the form of a class in which a controlling program will form instances of that class, i.e. objects.

However, many of the modules such as the model builder or the solver may create their own objects, and to help keep the specification clear, all further references to objects are to be understood as an instance of class generated or invoked by a module. In FIG. 1, objects are represented by ellipses, modules by rectangles, data such as equations or fragments by narrow parallelograms, and decisions by rhombi.

Figure 2:
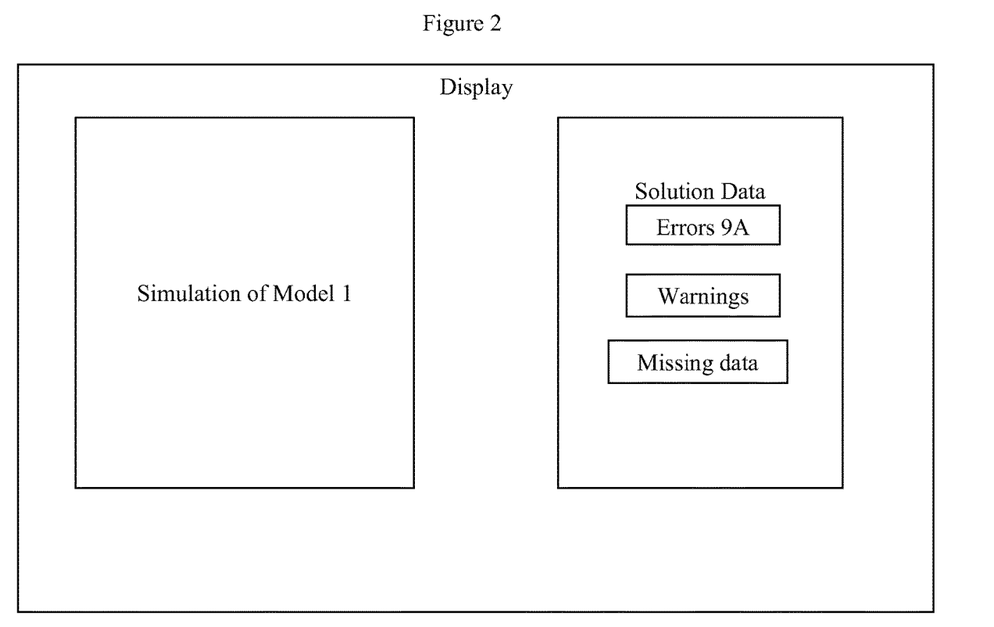
FIG. 2 shows the output of the model display generator and solution display generator.

A module may be an instance of a class as explained above, or it may be simply a routine called by a driving class (i.e. a main class) or another module. Most modules can be created in system memory through the execution of instructions in the main class or in another module. Modules described in the specification include: design importer 10, model builder 20, solver 30, fragment collector 40, data validator 50, data coupler 60, solver object generator 70, data prognosticator 80, constraint setter 90, solution display generator 100, and model solution display generator 110. Through these modules, the software platform can create a model 1 and provide the user feedback in the form of solution data 9 or solution diagnostics while the model is being constructed. A feedback loop 2 sends incremental solution and/or diagnostic data from the solver 30 to the model builder 20 for displaying solution data and/or diagnostic data while the user is in the process of building the model. This allows a user to see the impact of changes made to the model as the model is prepared rather than requiring the user to wait until the entire model is finished. If the solver 30 does not have enough information to process a meaningful solution (described below), the solver 30 may send a message to the solution display generator that it does not have enough information from the fragments and/or equation objects to generate a meaningful solution. In such a case, the solution display generator 100 may display what information is missing 24 to generate meaningful solution. FIG. 2 shows the combined output of the model display generator 110 and the solution display generator 100. In some embodiments, the solution display generator 100 provides display information to the model display generator 110.

The system may call or invoke a fragment collector 40 to obtain model fragments 6 (sets of model objects) from the system memory of the computer and provide them to the solver 30 so that the solver 30 can execute computational methods on data that was derived from fragments 6. The fragment collector 40 may also be controlled by a main driving class. In some cases, the solver 30 will only process fragments 6, when the solver 30 can determine a meaningful solution. A meaningful solution is controlled by the definition of a fragment. If a pattern of modeling objects is defined such that the system can recognize the existence of modeling objects that match that pattern when sufficient modeling objects are created, an event trigger is defined such that the system can recognize that the event has occurred, a solver method has been defined that the system is capable of executing, an output target has been defined that the system is capable of accessing, and optionally a follow on method (either solver or modeling has been defined that the system is capable of executing then the fragment is deemed meaningful. A fragment can be deemed meaningful when a solver method can be successfully invoked upon a collection of one or more modeler objects satisfying a defined object pattern.

Figure 3:
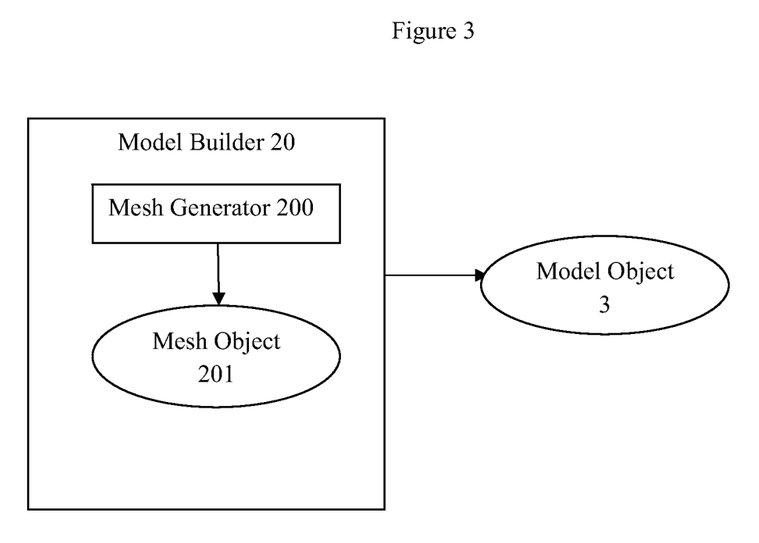
FIG. 3 shows a schematic view of a model builder.

The model builder 20 is configured to generate the model and create model objects 3. Model objects 3 are used by the solver 30 (either directly or through the data coupler 60) to provide the solution display generator 100 with solution data 9 that is made visible to the user while he or she is building the model (See, FIG. 2). These objects 3 and other to be described below may be stored in a computer's system memory using a data structure or some sort of database (which may utilize storage external to the interactive solver or the computer). The model builder 20 may contain a mesh generator 200 for building a mesh representation or mesh object. The mesh generator may take as an input a geometry model created by the model builder and convert it to a mesh model having mesh objects 201 (FIG. 3).

The solver 30 can create solver objects 4 (such as data tables and arrays) representing the coefficients of sets of equations 5. Checking and/or solving equations 5 allows the solver 30 to determine whether there are any errors 9A or warnings 9B (these are types of solution data) associated with the model 1 being assembled with the model builder 20.

If the model object 3 and solver object 7 can use a common data representation then the solver 30 can operated directly upon the model object 30. If not the solver object generator 70 can generate solver objects 7 from the model object 3 and the data coupler 60 can maintain synchronization between the model object 3 and the solver object 7. In some configurations, a corresponding model object 3 and solver object 7 can have a common data representation and access instructions, thereby allowing the fragment collector to collect fragments without performing an additional translation into a form accessible to the solver 30. (This is illustrated by the "yes" decision tree coming from the compatible decision 21.) Whether the fragments are directly accessible depends on the schema of the model object. A determination as to whether fragments will be directly accessible by solver can be determined at design time of the data schema.

At any given time, the solver 30 might not have enough information (in the form of solver objects derived from model objects 3) to execute the solver methods 5 and generate solution data 9. The solver 30 includes the solver methods that operate on the solver/modeler objects. If the data validator 50 determines this is the case (decision 23), a data prognosticator 80 can determine what the probable data/values should be. These data (also called proxy data storable as proxy objects 8) can be determined based on algorithms that examine the definitions of simulation context 41 and/or modeling context 42 of the current simulation session to determine what data and/or values are most likely intended by the user. The data prognosticator 80 may create a proxy object 8 to store and access the proxy data. The data prognosticator 80 may use simulation context 41 from the current modeling environment or modeling context 42 from the current modeling or model data from the current model 1 to determine the proxy data for the proxy object 8. The platform may be implemented with a database of simulation context 41 and modeling context 42 so that the data prognosticator has information from which it can predict the proxy data. The simulation context and modeling context may be made persistent in the platform.

Using the solver objects 7, model objects 3, and/or proxy objects 8, the solver 30 can attempt to execute the solver methods 33 and provide solution data 9 to the user via the solution display generator 100 while the use is generating additional model objects 3.

Figure 4:
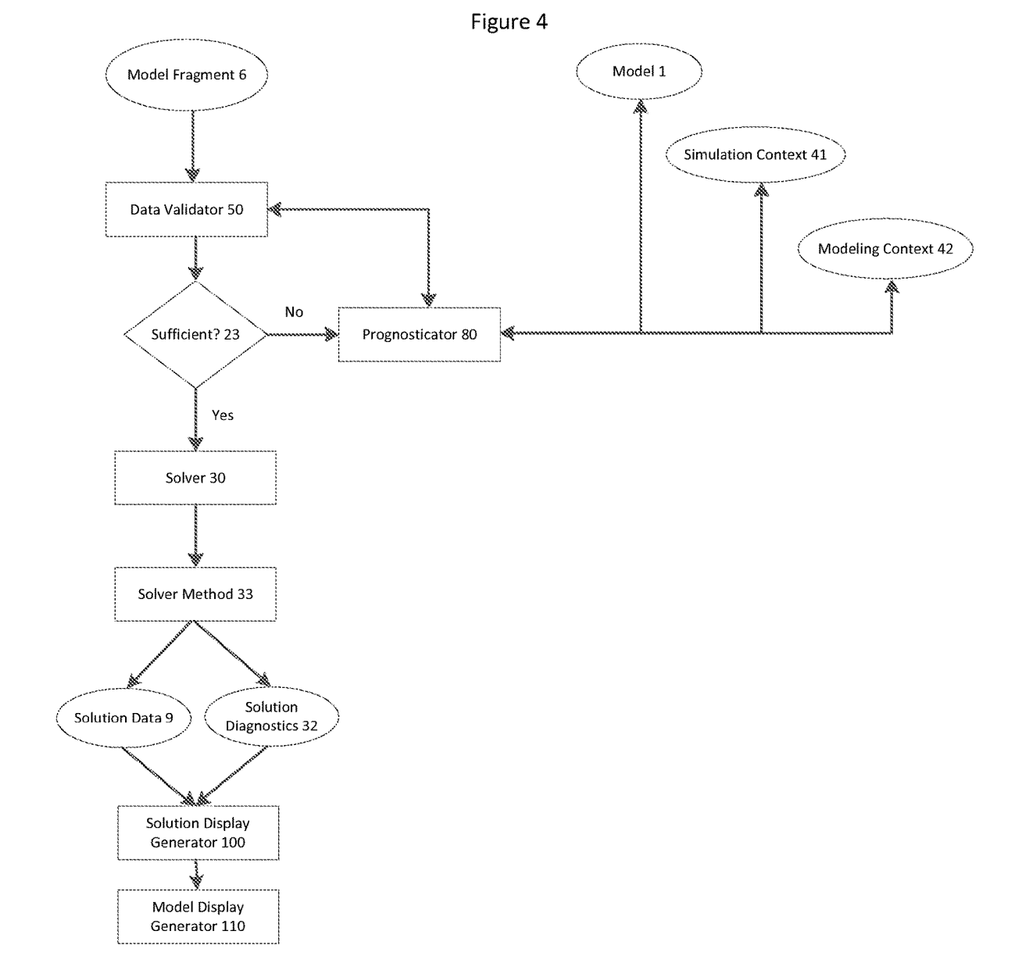
FIG. 4 shows a flow diagram of how the solver determines whether to request additional proxy data.

FIG. 4 shows a process flow diagram of how the data validator determines whether to request additional information from the data prognosticator. A fragment containing one or model objects is collected by fragment collector (not shown) and delivered to the data validator. The data validator reviews the information contained in the fragment and determines 31A whether there is enough information in the fragment for the solver to execute the solver method from which meaningful information can be processed and extracted for display to the user. If yes, the solver performs solution diagnostics 32 and if possible generates solution data 9 on the fragment 6. Generation of solution data 9 and solution diagnostics are examples of solver methods 33. The results of the solver method may be fed to the model display generator 110. In some embodiments, the results are first sent to a solution display generator 100, which ultimately delivers the results to the model display generator 110.

If the results of the data validators determination as to whether it has enough data 31A is no, the data validator may invoke the data prognosticator 80 to generate proxy objects 8 containing proxy data. To generate the proxy object, the prognosticator may solicit information about the model 1, simulation context 41, and model context 42. Using this information the solver 30 may then be invoked and will attempt to generate solution data and/or results that are sent to the model display generator 110 as before. If the solver 30 does not have enough information, it may initiate solution failure diagnostics to determine why it cannot generate results. The reasons why it cannot generate results may be sent to the model display generator 110.

In certain configurations, a solver method that can process a model fragment is capable of processing the objects inferred by the object pattern. If the solver method cannot process the objects, then the method will not provide useful incremental information, other than to identify the fact that required information is missing. Note that identification of missing information is in itself useful information, particularly when it is presented to the user during the modeling session, without having to wait for a full manual job submission.

The CAE platform may feature a geometric design importer 10, which imports an underlying design that the model builder uses to create objects. A constraint setter 90 may specify certain attributes or properties of the model objects such as an object's material, property, load, and/or constraint attributes.

In one configuration, the invention may be implemented as a sequence of steps to be performed by a computer. The model builder 20 may generate one or a plurality of model objects 3, and initiate the solver 30 to determine whether the model objects have constraints 91 that effect model objects 3. The solver 30 can attempt to execute solver methods on the solver objects and/or model objects The solver 30 may pass any solution data 9 it obtains to the solution display generator 100, so that the user can view the solution data 9 while the user is building the model with the model builder 20. New object patterns can be determined by the user and the platform can be configured such that new object patterns, triggers, solver methods, output destinations and follow on methods can be defined by the user at run time (not just at design time by the software creator.)

The platform/software may employ persistence techniques in the objects. Both the model builder 20 and the solver 30 can access these persistent objects, and certain configurations of the invention will feature persistent objects having a common data representation. In such embodiments, the solver 30 may be able to act on the model object 3 as soon as it is created. In configurations where the model builder and solver can't use the same object because the data requirements of the modules are different, the platform may use the data coupler 60 to continuously and automatically transform data accessed by way of the model objects 3 so that solver methods may be used to access them. Solver methods may be called directly by the solver 30 to access the data, and integrity between the equation objects 7 and model objects 3 are maintained through the data coupler 60. There are several ways to ensure integrity between the equation objects 7 and model objects 3. For example, utilizing event notification, a listener may be registered with a particular model object, so that the solver is notified if the model building changes the model object while the solver is working on the equation object.

The following examples illustrate certain specific implementations of the invention. Model fragments suitable for incremental solution by certain solver methods may be defined using rules that are interpreted at run time by the platform. A preexisting set of rules may be stored in a rule core, and users of the platform may add or extend the rules using a rule customizer. An exemplary set of rules may include rules governing:

1. Object pattern: a definition of the patterns of objects that make up a valid fragment.
2. Trigger: a trigger event that will cause one or more solver methods to be involved.
3. Solver methods: solver methods that are executed on the model objects.
4. Output destination: requirements for where (and in what format) output data from the solver's solution of equations created from the model fragments is returned.
5. Optional follow on method: other events (solver, modeler, post-processing or other) which must be executed after the solver returns a solution.

An object pattern can be any instance of an object type that is supported by the system. For example, a "Mesh body" is an example of a data object type, as is a "Spot Weld" or a "Bolt" or a "Part." More complex object patterns can be aggregation of object types such as a series of spot welds along the flange of a sheet metal part. This comprises multiple spot weld objects, however they are related because they were defined to be the group of spot welds, for example with a defined spacing, that connect the part to another part. The most complicated object pattern can be a set of objects that are not logically related in the system data model but instead are identified by user programmable logic. For example a user may want to define an object pattern by looking for instances where a single shell element is bounded by bar elements on all edges. In this case, the individual object types are defined in the system data model, the instances of shell and bar elements are all present in the database, but the relationship that identifies the precise pattern uses a custom script to identify.

A trigger can take many forms. One example of a trigger is the creation of an object—the moment of its creation triggers an event. Another example is modification of an object—the instant that the object is updated can trigger an event. Other examples included direct user input.

In general, triggers occur due to changes in state of objects, or the application or the environment.

Solver methods are predominantly equation solutions (or preparation of equations for solution).

A follow on method can be any method supported by the system. When the system is delivered, it achieves all of its functionality through methods. Methods operate on data to produce new data or modify existing data. Therefore, a follow on method is any system provided method. The system also enables users to define their own methods so a follow on method can be a custom or user defined method. In most cases these methods will actually be sequences of methods—one method that will call a sequence of other methods.

Example 1: Interactive Mesh Quality Calculations

1. Object pattern: an automatically generated mesh. A mesh region is a collection of nodes and elements that are generated using a meshing algorithm. The meshing algorithm is implemented within the mesh generation service. The algorithm is the set of rules, the service is the executable code that implements these rules and transforms the input (geometry, another mesh, etc.) into a mesh.
2. Trigger: Successful completion of a method of the mesh generation service (or mesh generator). This is the method that actually generates the mesh.
3. Solver methods: Those solver methods that calculate the quality metrics for the elements in the mesh. Mesh quality metrics include measurements of the individual element shapes such as taper, skew, Jacobian, warpage etc.
4. Output destination: The element quality data will be returned to the mesh quality container associated with the input mesh.
5. Optional follow on method: Select an interactive method that will cause the previously calculated element quality data to be visualized in the graphics display area. An alternate follow on method may include displaying a visual cue in the application to indicate that mesh quality data is available instead of automatically displaying it.

The above example will cause the modeling platform to display the element quality criteria to the user every time the user creates a mesh object using the mesh generator. The element quality criteria will be displayed using methods executed by the finite element solver that can otherwise not be invoked until such time as the user manually submitted the job to the solver for a solution. In this example, the object pattern can be "Object Type=MeshRegion." A mesh region is a data type supported by the system data schema. When the users or the platform creates a mesh (by for example using a mesh generator 200), the platform is creating an instance of a mesh region object. The nodes and the elements compose the mesh—the mesh is an aggregation of objects, comprised of node objects and element objects plus other mesh attributes/parameters that are object dependent. The meshing algorithm includes a number of functions and algorithms that enable creation of a mesh from some underlying structure (geometry, or another mesh, or other input spatial data) plus some controlling attributes and parameters.

The element quality data is the values of the taper, skew, Jacobian, warapage etc. that the solver method calculates for each element. The mesh quality container is a computing data structures such as a list or an array that holds this data. This data structure and the mesh which it relates to are connected by a reference. Either the mesh holds a reference (pointer) to the quality data structure or the quality data structure holds a reference to the mesh or both. This allows the system to associate the quality data to the mesh. In the UI, the system will display this reference graphically—for example the mesh object on the model tree may have a child node that represents the mesh quality data—when the user clicks on the child node the system will display the mesh quality data graphically.

Nodes are the most basic intrinsic object type used in the finite element method and define locations in space where the structure that is being modeled exists. Nodes are the location in space where the solver calculates the forces and displacements. Elements are the next most basic object type used in the finite element method. Elements define nodal connectivity—how nodes are connected to each other and they provide stiffness information to the solver. Parts are collections or nodes, elements, geometry and other modeling objects that typically correspond to the real parts of the object that is being simulated—for example a combustion engine model can use Parts top represent pistons, connecting rods, engine block, crankshaft etc. The discussion in this context refers to Parts in a Part/Assembly context, as an organizational structure for a complex model.

Example 2: Spot Weld Calculation

1. Object pattern: A single spot weld object or a pattern/grouping of spot weld objects. A spot weld generator may create the spot weld.
2. Trigger: Successful completion of an interactive method that creates individual spot welds or patterns of multiple spot welds (like a line of spot welds with a given spacing).
3. Solver methods: Solver methods that calculate connectivity of the spot weld to nodes and elements in the Parts that the spot weld joins together. This calculation may create additional modeling objects and constraints usable by the solver to calculate the response of the solver.
4. Output destination: The new modeling objects and diagnostic data will be returned to a container and associated with the original spot weld modeling objects.
5. Option follow on method: Select an interactive method that will cause the previously generated solver objects to be displayed on a graphics display alongside the original spot weld object. An alternate follow on method may be to display a visual cue in the application to indicate that an alternate view of the spot weld objects is available instead of automatically displaying it.

The above example may cause the application to immediately generate an additional low level solver object(s) required to represent the spot weld connections (i.e. spot weld connection objects) as soon as the user creates the spot weld objects in the GUI. It does this by invoking the appropriate solver methods automatically as soon as the spot welds are defined instead of waiting until the user manually submits the complete job.

The spot weld is a 1D object with two ends. Each end of the spot weld is connected to a Part. In the physical world, the spot weld is a blob of metal that fuses to the joined parts and creates a continuous region of metal—this is what joins the parts. In the modeling world, the spot weld is a "line" and each end of the "line" has to be connected to the nodes/elements that are used to represent the parts that are being joined. The solver uses the ends of the spot welds to be connected to the joined parts—this is done by identifying nodes/elements in each part that are close to the ends of the spot weld "line" and defining that the spot weld ends connect to these nodes/elements.

The modeling objects are created by the user who invoked methods provided by the system to create modeling data objects. Diagnostic data is created by the solver methods as they process the input data. For example information about the number of degrees of freedom in the model, estimates of memory/time required to solve the model, errors or warnings related to the input data (element skew is outside recommended values for example, or material information is missing). In this case, the solver method will generate an alternate representation of the spot weld. The user will create an abstract model consisting of a line object that joins two Part objects. The line may have a diameter based on the user defined spot weld diameter. The solver will generate an alternate, but equivalent representation consisting of low level solver objects such as constraint equation or rigid links. The objects generated by the solver generated will be stored in a container such as a class or an array and will be associated to the abstract weld data object using pointers or equivalent. The system may display the spot weld in the model tree as one single tree node with two children. One child for the abstract representation and one for the solver generated version.

Example 3: Computational Part Generation

1. Object pattern: A Part object containing one or more mesh objects.
2. Trigger: Completion of the generation of a mesh object within a Part object.
3. Solver methods: Solver methods that create a reduced computation part representation from a full fidelity FE Part representation.
   Note that there are multiple ways to generate a computational part from a full fidelity part. The choice of computational part generation for any given model will be determined from the simulation and modeling contexts that are current within the session.
   Note that the methods required to create a computational part from a full fidelity part require more information than just the mesh definitions referenced in this example.
       These methods will use all data that is required and available within the model definition and will provide default values for any missing data. The default data values will be provided from the simulation or modeling context defaults.
4. Output destination: The computation part generated by the solver methods and all associated diagnostic information will be returned to a new, automatically generated "Part Configuration" container with the originating Part. Part Configurations are data structures within the application data model that are used to hold multiple alternate representation of the same Part.
5. Option follow on method: Define a method that will display the mode shapes of the newly created computation part in the 3D graphics display are of the application.

The above example will cause a computational part representation of a Part containing a finite element mesh to be automatically created each time a mesh object is added to or created within a Part and optionally will cause the application to display the model shapes associated with that Part.

A full fidelity representation comprises all of the nodes element materials and properties that represent the object that is being simulated. In order to calculate stresses, strains and displacements this representation must be solved for every degree of freedom associated with very node. A computational part representation is generated from the full fidelity part representation and is processed by the solver to create an equivalent representation that contains much fewer degrees of freedom. This reduced computation part can be used in place of the full fidelity part (subject to some limitations) and will cause the solution of the system to analyze or process the mesh more quickly.

In this example, a "Part" can be considered to be a handle for some piece of the model. For example "Piston" or "Crankshaft." The system can represent this part using a number of different approaches, i.e. a full fidelity approach, or a computation part approach. Each of these approaches can be presented as different "Part" submodels. Thus, there is a full fidelity model of the part and a reduce model of the part. Both models represent the same Part (Piston, crankshaft) but the models have different purposes, depending on what the user wants to do. In this case the "Part" can be considered a container—it "contains" both the full fidelity model and the reduced model. The full fidelity model can also be considered a Fragment—it is this full fidelity fragment from which the reduced mode is generated.

The detailed description set forth above in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with one or more aspects.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "logic," "data processing apparatus," or "computing device," encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, while certain embodiments have been described with respect to searching of a single media type, i.e., image search or video search, one or more embodiments are also relevant to a generic search where the search results are blended with different media types. Thus, for example, a user can type in a keyword search phrase into an Internet search engine and obtains results that contain images, video and other media types blended with text results, and in which relevant matching advertisements are obtained (and provided to the user) that match one or more of these multi-media search results. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for a computer simulation platform to solve a model while the model is being built by the computer simulation platform, the method comprising:
   obtaining, by a fragment collector of the computer simulation platform, fragments of the model, the model comprising a first component having the obtained fragments and at least a second component;
   determining, by a data validator of the computer simulation platform, whether the obtained fragments contain sufficient data for a solution;
   simultaneously determining, by a solver of the computer simulation platform, the solution for the first component of the model and building, by a model builder of the computer simulation platform, the second component of the model by adding, to the second component, at least one fragment in addition to the obtained fragments of the first component based on user input to add the at least one fragment to the second component, wherein the solution for the first component is determined based on the obtained fragments without the at least one fragment; and
   simultaneously displaying, by a solution display generator, the solution for the first component of the model while building, by the model builder, the second component of the model, wherein displaying the solution for the first component is different from displaying the first component.

2. The method of claim 1, wherein each of the fragments comprises at least one model object.

3. The method of claim 1, wherein determining whether the obtained fragments contain sufficient data for the solution comprises determining, by the data validator, whether meaningful information can be extracted from the obtained fragments to be displayed to a user.

4. The method of claim 3, wherein the solution is determined when the obtained fragments contain sufficient data for the solution.

5. The method of claim 3, further comprising generating, with a data prognosticator, at least one proxy object containing proxy data.

6. The method of claim 5, wherein generating the at least one proxy object comprises soliciting information related to the model and at least one simulation context associated with the model in response to determining that the obtained fragments do not contain sufficient data for a solution.

7. The method of claim 6, further comprising:
   initiating failure diagnostics to determine reasons leading to a lack of information when the lack of information prevents generating the solution; and
   displaying, by the solution display generator, the reasons to the user.

8. The method of claim 1, wherein determining whether the obtained fragments contain sufficient data for the solution comprises determining whether the model builder and the solver are capable of using a common data representation.

9. The method of claim 8, further comprising instructing, by the data validator, a solver object generator to generate a solver object using the obtained fragments when the common data representation cannot be generated.

10. The method of claim 9, further comprising continuously synchronizing data stored in the obtained fragments and the solver object.

11. A non-transitory computer-readable media having instructions stored thereon such that, when executed by one or more processors of a computer simulation platform, performs a method for solving a model while the model is being built, the method comprising:
   obtaining, by a fragment collector of the computer simulation platform, fragments of the model, the model comprising a first component having the obtained fragments and at least a second component;
   determining, by a data validator of the computer simulation platform, whether the obtained fragments contain sufficient data for a solution;
   simultaneously determining, by a solver of the computer simulation platform, the solution for the first component of the model and building, by a model builder of the computer simulation platform, the second component of the model by adding, to the second component, at least one fragment in addition to the obtained fragments of the first component based on user input to add the at least one fragment to the second component, wherein the solution for the first component is determined based on the obtained fragments without the at least one fragment; and
   simultaneously displaying, by a solution display generator, the solution for the first component of the model while building, by the model builder, the second component of the model, wherein displaying the solution for the first component is different from displaying the first component.

12. The non-transitory computer-readable media of claim 11, wherein determining whether the obtained fragments contain sufficient data for the solution comprises determining, by the data validator, whether meaningful information can be extracted from the obtained fragments to be displayed to a user.

13. The non-transitory computer-readable media of claim 11, wherein the solution is determined when the obtained fragments contain sufficient data for the solution.

14. A method for a computer simulation platform to generate a model, comprising:

generating, by a solver of the computer simulation platform, a solution for at least one first fragment of the model, the model comprising the at least one first fragment and another component;

simultaneously displaying, by a solution display generator, the solution for the at least one first fragment of the model and building, by a model builder, the another component of the model by adding, to the second component, at least one second fragment to the another component based on user input, the at least one second fragment being different from the at least one first fragment, wherein displaying the solution for the at least one first fragment is different from displaying the at least one first fragment, wherein the solution for the at least one first fragment is determined based on the at least one first fragment without the at least one second fragment.

15. The method of claim 14, further comprising:
obtaining, by a fragment collector, the at least one first fragment; and
determining, by a data validator, whether the at least one first fragment contains sufficient data for a solution.

* * * * *